United States Patent
Besehanic

(10) Patent No.: US 9,367,831 B1
(45) Date of Patent: Jun. 14, 2016

(54) METHODS AND APPARATUS FOR INVENTORY DETERMINATIONS USING PORTABLE DEVICES

(71) Applicant: The Nielsen Company (US), LLC, Schaumburg, IL (US)

(72) Inventor: Jan Besehanic, Tampa, FL (US)

(73) Assignee: THE NIELSEN COMPANY (US), LLC, New York, NY (US)

( * ) Notice: Subject to any disclaimer, the term of this patent is extended or adjusted under 35 U.S.C. 154(b) by 0 days.

(21) Appl. No.: 14/658,964

(22) Filed: Mar. 16, 2015

(51) Int. Cl.
*G06K 15/00* (2006.01)
*G06Q 10/08* (2012.01)

(52) U.S. Cl.
CPC .................... *G06Q 10/087* (2013.01)

(58) Field of Classification Search
CPC .............. G06K 17/00; G06K 17/0022; G06K 2017/0051; G06K 2017/0074; G06Q 10/08; G07C 9/00007; G07F 9/026; G07G 1/0036; G07G 1/009
USPC ................................. 235/383, 385
See application file for complete search history.

(56) References Cited

U.S. PATENT DOCUMENTS

| | | | |
|---|---|---|---|
| 3,376,547 A | 4/1968 | Auer, Jr. | |
| 4,797,819 A | 1/1989 | Dechirot | |
| 5,654,508 A | 8/1997 | Gibbs | |
| 5,963,134 A * | 10/1999 | Bowers | G06K 17/00 235/375 |
| 6,664,892 B2 | 12/2003 | Thomas et al. | |
| 7,245,558 B2 | 7/2007 | Willins et al. | |
| 7,693,757 B2 | 4/2010 | Zimmerman | |
| 7,710,824 B1 | 5/2010 | Katzer et al. | |
| 8,077,041 B2 | 12/2011 | Stern et al. | |
| 8,145,546 B2 | 3/2012 | Coveley et al. | |
| 8,171,786 B2 | 5/2012 | Burris | |
| 8,260,456 B2 | 9/2012 | Siegel et al. | |
| 8,676,377 B2 | 3/2014 | Siegel et al. | |
| 2010/0017407 A1 | 1/2010 | Beniyama et al. | |
| 2014/0279290 A1 | 9/2014 | Rimnac et al. | |

* cited by examiner

*Primary Examiner* — Seung Lee
(74) *Attorney, Agent, or Firm* — Hanley, Flight & Zimmerman, LLC

(57) ABSTRACT

Methods and apparatus for inventory determinations using portable devices are disclosed. One disclosed example apparatus includes a detector of a portable device to determine one or more of an orientation or a position of a portable device relative to a product or a shelf storing the product, where the portable device is independent of the shelf. The disclosed example also includes a transmitter of the portable device, where the transmitter is to transmit a signal towards a rear surface of the shelf, and where the rear surface faces toward the product. The disclosed example also includes a receiver of the portable device to receive a reflected signal corresponding to the transmitted signal, where the reflected signal reflected from the rear surface of the shelf. The disclosed example also includes a processor of the portable device to enable the transmitter based on the detected orientation or position of the portable device, and to determine inventory information about the product on the shelf based on the reflected signal.

32 Claims, 10 Drawing Sheets

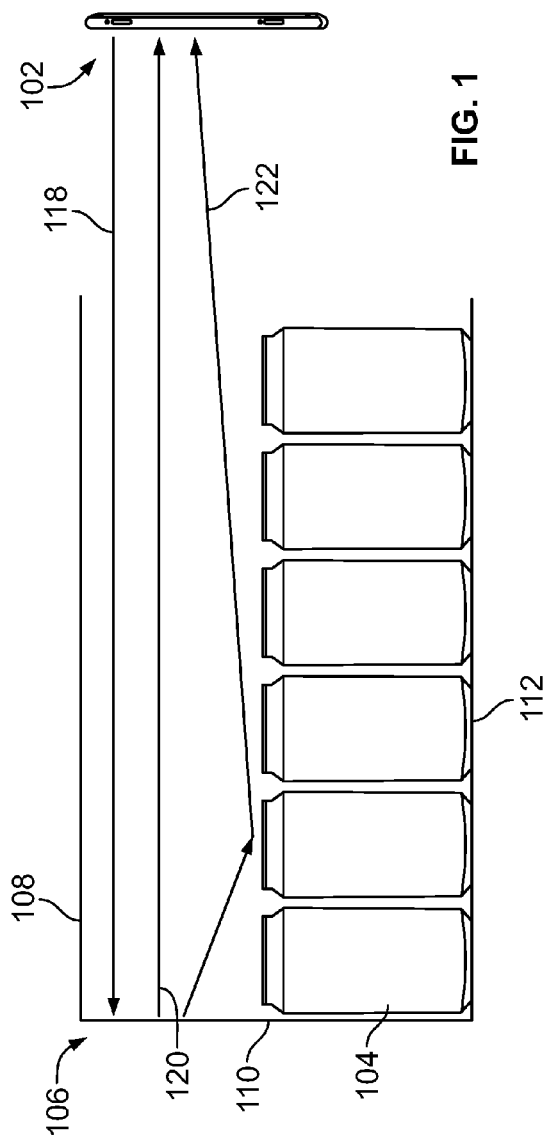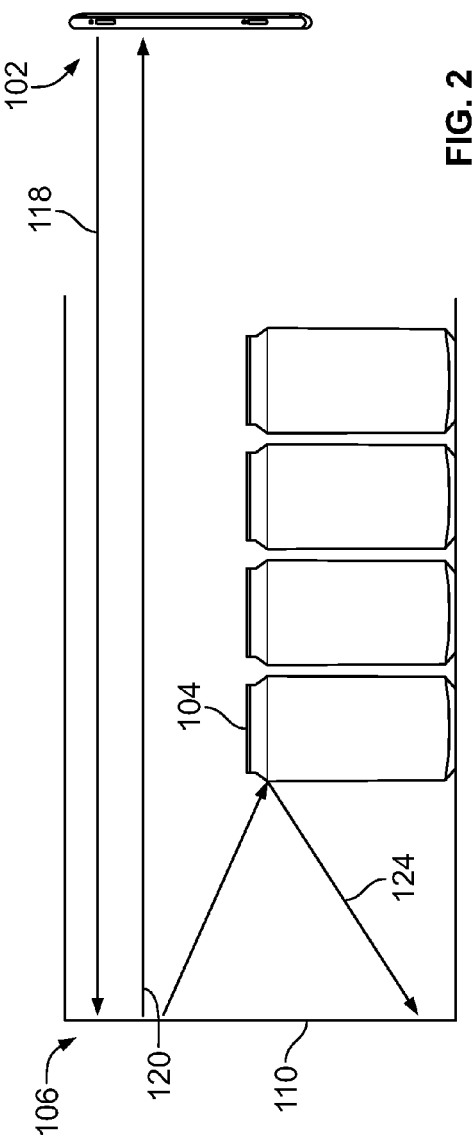

METHODS AND APPARATUS FOR INVENTORY DETERMINATIONS USING PORTABLE DEVICES

FIELD OF THE DISCLOSURE

This disclosure relates generally to inventory determinations, and, more particularly, to methods and apparatus for inventory determinations using portable devices.

BACKGROUND

In typical retail environments, it is generally difficult to visually determine the amount of inventory on a shelf. This is often due to item(s)/product on the shelf being pushed towards a front and/or a front portion of the shelf (e.g., towards the aisle in a retail environment). Typically, it is time-consuming to manually assess inventory (e.g., inventory counts, stock determinations, product depth etc.) in these environments and known methods involving automated inventory determinations may require specialized equipment and/or components, which often require significant capital expenditures and/or operating costs (e.g., expenses associated with operating automated inventory systems, service and/or maintenance expenses, etc.).

Some known inventory systems rely on sensors that are integrated with a shelf to determine product depth and/or utilize backers that push inventory. In particular, the known inventory systems may transmit signals towards the positional backers and the sensors may determine positional information from the positional backers via reflections of the transmitted signals to determine inventory information about products stored on these shelving systems. These systems often require a significant number of parts including, for example, the positional backers, detecting equipment, wiring and/or a networking infrastructure to collect, sort and/or compile the inventory information/data. As a result, these systems may also require significant set-up time to align and/or calibrate the detecting equipment.

BRIEF DESCRIPTION OF THE DRAWINGS

FIG. 1 illustrates use of an example portable device in accordance with the teachings of this disclosure in a first example scenario in which a baseline inventory condition is being determined.

FIG. 2 illustrates use of the example portable device of FIG. 1 in a second example scenario in which another inventory condition is to be determined.

Figure 3A:
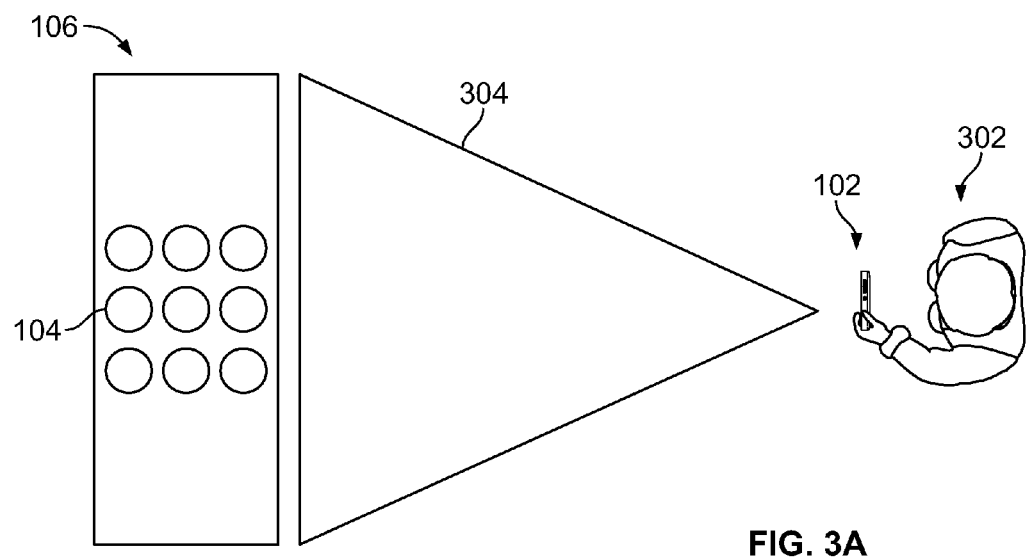
FIGS. 3A and 3B illustrate examples of how the example portable device of FIG. 1 is aligned and/or oriented relative to a shelf or product stored on the shelf.

The figures are not to scale. Wherever possible, the same reference numbers will be used throughout the drawing(s) and accompanying written description to refer to the same or like parts. As used in this patent, stating that any part is in any way positioned on (e.g., positioned on, located on, disposed on, or formed on, etc.) another part, means that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

Methods and apparatus for inventory determinations using portable devices are disclosed herein. Typically, inventory determinations (e.g., stock measurements, inventory measurements, etc.) may be difficult to accomplish visually. In particular, it is generally common to push inventory (e.g., product) and/or stock to a front portion of a shelf in a retail environment and, thus, a resulting generally hidden gap between a rear surface of the shelf facing the product and the rearmost portion of the product is formed in a partially-full inventory condition, for example. This resulting gap is often behind the product and, thus, it is usually difficult to measure and/or determine the amount of product on the shelf, which is also known as the product depth, through visual inspections.

The examples disclosed herein allow for quick and efficient inventory determinations and/or measurements of product depth of a shelf even in scenarios in which product is pushed towards the front of the shelf resulting in a gap. The examples disclosed herein allow a portable device (e.g., a cell phone a tablet, a laptop, etc.) to be used to measure product depth instead of known systems having expensive and complex shelf-integrated depth product measuring devices (e.g., measuring devices mounted to and/or integrated with a shelving system), which often have numerous sensors and/or moving parts. The examples disclosed herein use readily available portable devices that are significantly less expensive and/or complex than the shelf-integrated depth product measuring devices.

The examples disclosed herein enable a user with a portable device to transmit a signal from the portable device to the gap between a shelf and product on the shelf (e.g., around the product). The portable device analyzes the corresponding reflected signal to determine inventory information (e.g., inventory depth) based on the gap between the product and the shelf. In some examples, the portable device automatically records the measured inventory depths, for example. Some examples utilize acoustic signals via a built-in speaker and microphone to measure the inventory depth, thereby utilizing capabilities and/or components that are readily available in many typical portable devices including, but not limited to, cell phones, tablets, laptops, etc. Other types of signals may be utilized The examples disclosed herein utilize a portable device to transmit a signal (e.g., an acoustic signal, an optical, a sonar signal, a sonar wave, an electromagnetic signal, etc.) towards a rear surface of a shelf that stores a product. In particular, the signal is transmitted around (e.g., over) the product to reach the rear surface of the shelf after the portable device indicates to a user, for example, where and in what orientation the portable device should be in in order to transmit the signal to properly measure inventory depth of the shelf. In some examples, the portable device prompts the user as to how to position and/or orient the portable device to send the signal. Prompting the user, in some examples, is accomplished utilizing a camera of the portable device in combination with a display of the portable device (e.g., a cross-hair view on a display of the portable device, a target reticle, etc.).

Once the portable device has been properly positioned and/or oriented through the aforementioned prompts and/or cues for example, the signal is transmitted around (e.g., over, to the side, etc.) the product and, in turn, reflected from a rear surface of the shelf. The shelf rear surface generally faces toward the product and a portion of the transmitted signal is reflected between a rear portion of the product and the shelf rear surface, thereby causing a reflected signal corresponding to the transmitted signal to be attenuated and/or have a delayed time in travel (e.g., delayed time of flight). The reflected signal is then received and/or detected by a sensor (e.g., a microphone in one example) of the portable device, for example, and analyzed to determine the inventory product depth on the shelf.

In some examples, the reflected signal is compared and/or analyzed in relation to a baseline signal. In some examples, the baseline signal is defined from a baseline inventory condition, in which the maximum amount of product is placed on the shelf (e.g., a full shelf) and a corresponding reflected signal (e.g., a baseline reflected signal) is characterized, recorded and/or analyzed to define an expected reflected signal when the shelf is full and/or an amount of product is maximized on the shelf. In other examples, a time delay and/or a temporal relationship between the transmitted signal and the reflected signal is used to determine the inventory product depth. In some examples a temporal relationship between the transmitted signal and the reflected signal along with pre-defined geometries and/or spatial relationships (e.g., shelf depth, a distance from the shelf to the portable device, product dimensions, etc.) are analyzed to determine and/or compute the inventory product depth.

In some examples in which a camera is used to position and/or orient the portable device, the portable device utilizes an image of the product to automatically associate determined inventory product depth associated with that corresponding specific product (e.g., a product stock-keeping unit (SKU), etc.). In some examples, the inventory product depth is transmitted to a server and/or central database to create inventory or ordering/replenishment records, for example, that are used for logistical and/or inventory planning.

FIG. 1 illustrates use of an example portable device 102, which is a cell phone in this example, in accordance with the teachings of this disclosure in a first example scenario in which a baseline inventory condition is being determined. In particular, the portable device 102 of the illustrated example is being used to characterize a baseline reflected signal corresponding to the baseline condition of a product 104 stored on a shelf 106. The shelf 106 of the illustrated example has a top surface 108, a rear surface 110 and a bottom surface 112, on which the product 104 sits. In this example, the top surface 108 is offset from a top of the product 104 to allow signals to travel therethrough. The top surface 108, the rear surface 110 and the bottom surface defined a volume of the shelf 106 that used to characterize inventory conditions of the shelf 106.

In this example, the baseline reflected signal corresponds to a scenario where the shelf 106 holds the maximum amount of the product 104 the shelf 106 can hold. While the baseline of this example relates to the maximum amount of the product 104 on the shelf 106, any other baseline information/data may be used including, but not limited to, half-filled, partially filled, a defined distance of product, etc.

In this example, the portable device 102 has been positioned and/or oriented relative to a shelf 106, which is storing the product 104 through a display of the portable device 102. In particular, a detector, such as a camera of the portable device 102, has been used to prompt or direct a user, for example, to properly align and/or position the portable device 102 relative to the shelf 106 and/or the product 104. As will be explained in greater detail in conjunction with FIGS. 3A-4B, in some examples, an application of the portable device 102 is used to properly align and/or orient the portable device 102 within pre-defined and/or acceptable ranges.

To characterize or determine the baseline signal, a signal 118 is transmitted from the portable device 102 towards the rear surface 110 when the portable device 102 is properly oriented and/or positioned. In this example, the signal 118 is transmitted below the top surface 108, but above the product 104. In other words, the proper orientation and/or position of the portable device 102 (e.g., when the orientation and/or position of the portable device are within acceptable range(s)) causes the signal to travel around (e.g., over, under and/or to the side, etc.) the product 104. Because a gap between the product 104 and the rear surface 110 is relatively small due the shelf 106 being generally full of the product 104, a portion (e.g., a directly reflected portion) 120 of the transmitted signal 118 is reflected back towards the device 102. Additionally, another reflected portion 122 of the transmitted signal is reflected over the top of the product 104 and back to the device 102.

FIG. 2 illustrates use of the example device 102 of FIG. 1 in a second example scenario in which another inventory condition (e.g., a partially full inventory condition) is to be determined. In this example, there is less of the product 104 on the shelf 106 in comparison to the scenario of FIG. 1, thereby defining a larger gap between the product 104 and the rear surface 110 due the remaining product 104 being pushed forward towards the front of the shelf 106. In this example, the transmitted signal still has the directly reflected component 120. However, in contrast to the example scenario of FIG. 1, a reflected portion of the transmitted signal 124 is reflected between the rear surface 110 and a rear surface of the product 104 before being reflected back to the example portable device 102, thereby resulting in attenuation and/or a time delay of the reflected signal 124 in comparison to the reflected signal 120 when the reflected signal 124 is detected at the portable device 102. The portable device 102 of the illustrated example, in turn, calculates the product depth of the product 104 based on the reflected signal 124. In particular, the portable device can use a comparison of the reflected signal 124 to the baseline inventory data of the baseline data of FIG. 1, which includes the directly reflected signal 120 and/or the reflected signal 122. In some examples, the portable device 102 compares the reflected signal 120 to the reflected portion 124 of the same transmitted signal 118 to determine a time differential and using the time differential to calculate the product depth.

FIG. 3A illustrates how the example device 102 of FIG. 1 is aligned and/or oriented relative to the shelf 106 and/or the product 104 stored on the shelf 106 to obtain baseline reflected acoustic data (e.g., baseline inventory data, etc.). In particular, the baseline reflected acoustic signal is recorded and/or analyzed to characterize a pre-defined baseline inventory condition and/or to be later used to analyze a later inventory condition (e.g., a second inventory condition) that is also characterized by reflected acoustic signals, for example. In this illustrated example, the baseline condition corresponds to a maximum amount of the product 104 being stored on the shelf 106 (e.g., a full inventory condition).

To establish a consistent baseline reflected signal, a user 302 of the illustrated example is prompted, directed and/or guided to properly orient the portable device 302 towards the shelf 106 and/or a portion of the shelf (e.g., towards a gap over the product 104, below the product 104 and/or a gap to the side of the product 104, etc.). Additionally or alternatively, the user 302 is also prompted, directed and/or guided to hold the phone at a proper distance and/or proper distance range from the product 104 (e.g., the product 104 is used a visual cue) by the portable device 102. In either example, an associated viewing angle (e.g., a viewing aspect ratio) 304 is used for characterization of the baseline inventory condition pertaining to the product 104 on the shelf 106 when the user 302 holds the portable device 102 relative to the shelf 106 and/or the product 104 in a pre-defined manner (e.g., the user 302 is holding the portable device 102 within a pre-defined distance range).

The user 302 of the illustrated example is directed by an application of the portable device 102 in conjunction with an imaging sensor such as a camera of the portable device 102. In particular, the user 302 views the shelf on a display of the portable device via the camera and prompts on the display direct the user 302 to the proper distance, for example, so that the camera is at the viewing angle 304. In some examples, the portable device 102 does not allow the user 302 to proceed (e.g., transmit an acoustic signal) without properly orienting and/or positioning the portable device 102. In some examples, the portable device 102 automatically transmits an acoustic signal once the device 102 determines that the portable device 102 is in a proper position and/or orientation to obtain reflected acoustic data of the product 104 on the shelf 106.

While the user 302 of the illustrated example is guided and/or directed by the portable device 302 to hold and/or direct the portable device 102 at the proper distance and/or orientation, in some examples there are physical markers near or on the shelf 106 and/or the product 104 to guide the user 302 instead (e.g., visual cues or markings on the product 104 and/or the shelf 106 to direct the user 302 to the proper distance and/or orientation needed for the portable device 102 to obtain acoustic data). In some examples, the visual cues are to be detected by the imaging device of the portable device 102 and used to aid in guiding the user 302 to orient and/or position the portable device 102. As will be discussed below in further detail with FIGS. 5 and 6, in some examples, a baseline measurement is not used.

In this example, the portable device 102 has a forward facing transmitter (e.g., a speaker) to transmit the acoustic signal. In some examples, a module (e.g., a speaker module, a speaker/microphone module) may be coupled or attached to the portable device 102 via a data connector so that the portable device 102 can cause the module to transmit the acoustic signal and/or detect the corresponding reflected signals towards the shelf 106 and/or the product 104. In some examples, a physical attachment may be coupled to the portable device 102 to re-direct or guide audio emitted by a speaker of the portable device 102. For example, a physical device may be coupled to a portable device to redirect a transmitted acoustic signal from a bottom-facing or a front-facing speaker of the portable device towards a direction the portable device is facing in a different direction.

In some examples, once the user 302 has properly oriented and/or positioned the portable device 102, the portable device and/or a speaker of the portable device may be oriented by the user 302 to transmit the acoustic signal (e.g., the speaker is directed toward a shelf). In some examples, the portable device 102 is wirelessly connected to a transmitter (e.g., a worn transmitter of the user 302, a transmitter on a lanyard held or worn by the user) and triggers the transmitter to emit the acoustic signal when the portable device 102 is properly positioned and/or oriented.

Figure 3B:
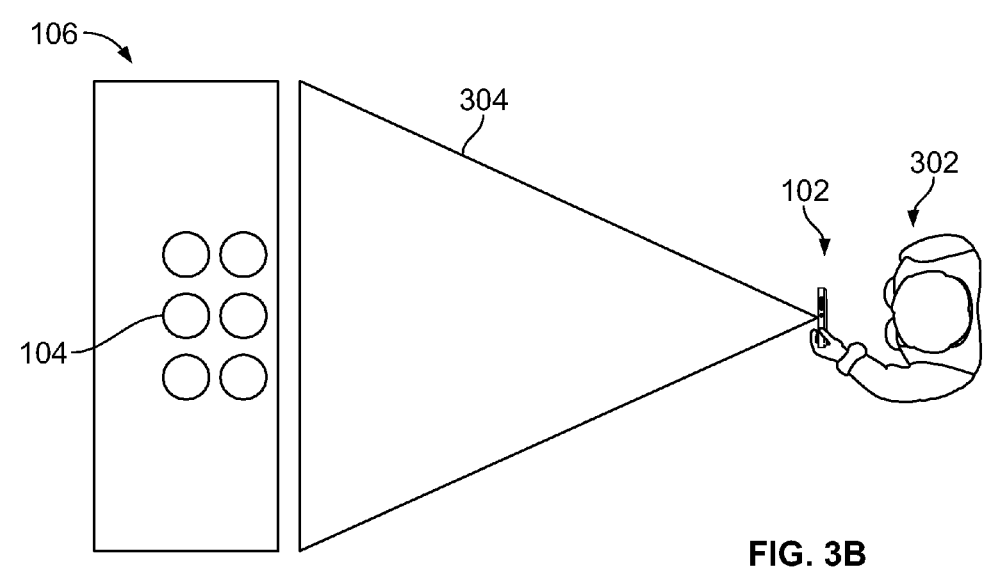

FIG. 3B illustrates another example of how the example portable device 102 of FIG. 1 is aligned and/or oriented relative to a shelf or product stored on the shelf when the shelf is partially stocked. The user 302 of the illustrated example positions and/or orients the portable device 102 to send a ping and analyze corresponding reflected acoustic signals of an inventory condition that is different from the inventory condition described above in connection with FIG. 3A (e.g., the shelf 106 is only partially full in FIG. 3B as opposed to being fully stocked as shown in FIG. 3A).

As described above in connection with FIG. 3A, the user 302 can be directed and/or guided to properly position and/or orient the portable device 102 relative to the shelf 106 and/or the product 104 on the shelf 106. Product/inventory in retail environments is often pushed towards the front of a shelf. Accordingly, the user 302 of the illustrated example can orient the portable device relative to the product 104 in the same or similar manner described above in connection with FIG. 3A. Even if the product 104 is not pushed forward, the application of the portable device 102 can primarily rely on the shelf 106 and/or visual cues on the shelf 106 for positioning and/or orientation of the portable device 102. In this example, once the user 302 has properly positioned and/or aligned the portable device to the viewing angle 304 to be consistent with baseline acoustic measurements (FIG. 3A), the user 302 uses the application of the portable device 102 to send an acoustic ping signal and record and/or analyze corresponding reflected acoustic signals related to the second inventory condition (e.g., the partially full shelf 106).

Figure 4A:
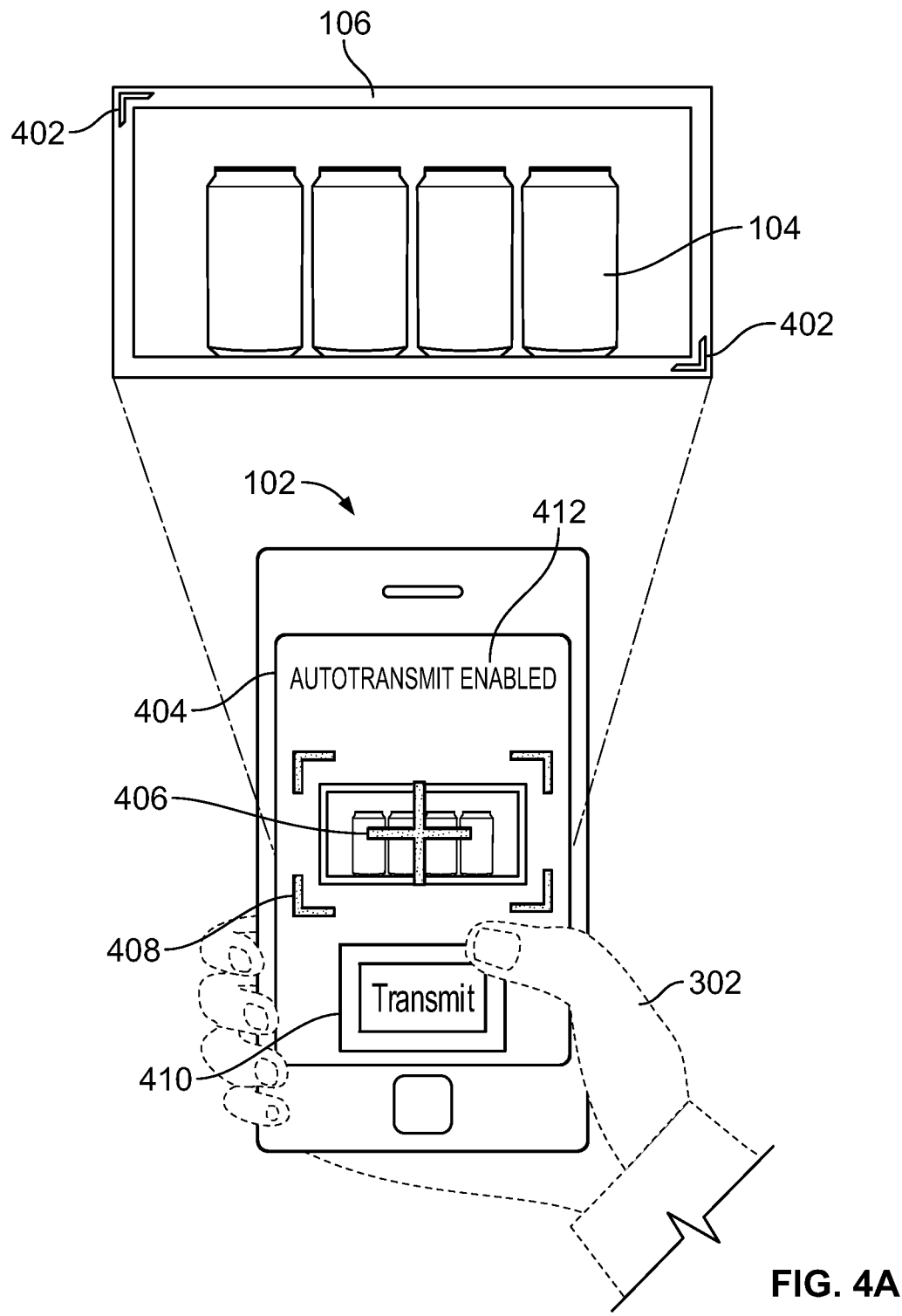
FIGS. 4A and 4B illustrate examples of how the example portable device of FIG. 1 may guide a user to properly align and/or orient the example portable device.
Figure 4B:
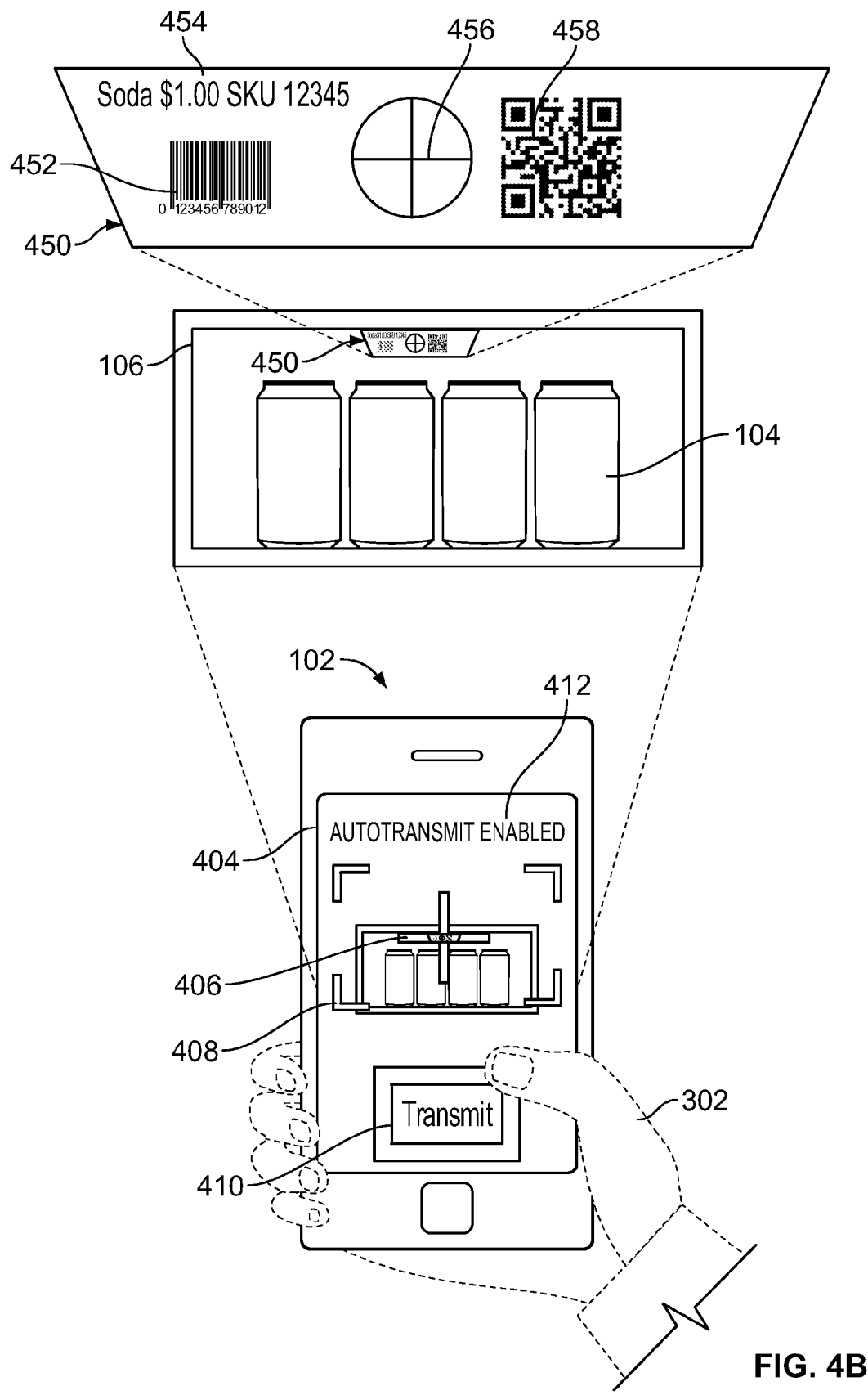

FIGS. 4A and 4B illustrate examples of how the example portable device 102 of FIG. 1 may guide a user to properly align and/or orient the example portable device 102. In these examples, the portable device 102 has a forward facing speaker. In the illustrated example of FIG. 4A, the portable device 102, which is being held by the user 302, is shown generally facing towards the product 104 and/or the shelf 106, which may have additional markings (e.g., corner markings) 402 to guide the portable device 102 to the proper orientation and/or position relative to the shelf 106. In particular, the portable device 102 of the illustrated example displays the shelf 106 on a display 404 of the portable device 102 by using a camera of the portable device 102, for example. The display 404 of the illustrated example includes a cross-hair 406, and a reticle 408 to visually guide the user 302 to properly orient and/or position the portable device 102 relative to the shelf 106. In some examples, the display 404 has a graphical transmit button 410 to receive input from the user 302 to send a signal towards the shelf 106. Additionally or alternatively, the display 404 may also have an indicator 412 to inform the user 302 as to whether the portable device is in an auto-transmit mode in which the portable device 102 may automatically transmit the signal when the portable device is properly positioned and/or oriented.

In this example, a processor of the portable device 102 is able to determine and/or verify a position of the portable device 102 relative to the shelf 106 based on imaging provided by the camera. For example, the processor, based on input from the camera, and/or an expected geometry of the shelf 106 (e.g., an overall size and/or shape), determines the approximate relative position of the portable device 102 to the shelf 106. Additionally or alternatively, the processor of the portable device uses the imaging of the camera in relation to the product 104 (e.g., distance determinations based on an expected size of the product 104 and/or how much of the product 104 is arranged in a horizontal direction in the view of FIG. 4A). Additionally or alternatively, a size of the product 104 is determined by identifying the product 104 by the camera and indexing a database that includes product sizes. In some examples, the corner markings 402 on the shelf 106 are used by the processor to determine the relative position of the portable device 102 in relationship to the shelf 106.

Regardless of how the processor determines the approximate position of the portable device 102 through the camera imaging, the display 404 prompts the user to reposition and/or re-orient the portable device 102 by guiding the user to align the reticle 408 and/or the cross-hair 406 with the shelf 106 and/or the product 104. In some examples, the reticle 408 and/or the cross-hair blink and/or change color when the user 302 has properly positioned and/or oriented the portable device 102. In some examples, the reticles 408 change size (e.g., scale) relative to the shelf 106 on the display 404 as the user 302 moves toward or away from the shelf 106. In some examples, visual cues (e.g., arrows) and/or a distance number is displayed on the display 404 to guide the user 302 to move the portable device 102 to a proper distance from the shelf 106. In some examples, auditory signals are used to guide the user 302 to move the portable device 302 and/or determine the position and/or orientation of the portable device 102 relative to the shelf 106.

Turning to FIG. 4B, which is similar to the example described above in connection with FIG. 4A, the user 302 has the portable device 102 generally oriented in a direction towards the shelf 106 holding the product 104 and is viewing the shelf 106 and the product 104 on the display 404. In this example, the shelf 106 of the illustrated example has a tag (e.g., a visual tag, an information tag, etc.) 450, which may be integral to the shelf 106 and/or attached (e.g., mechanically coupled) to the shelf 106. The tag 450 of the illustrated example has numerous visual indicators to be used by the portable device 102 to position and/or orient the portable device, and/or correlate inventory data (e.g., associate stock keeping units (SKUs) with detected reflected signals. In this example, the tag 450 has a bar code 452, text 454 that indicates a product name and/or a product price, a cross-hair (e.g., a target) 456 and a QR code 458. While numerous visual indicators are shown in this example, any single visual indicator may be used or any of the visual indicators can be used in combination with one another.

In this example, the cross-hair 406 and/or the reticle 408 are used to guide the user 302 to position and/or orient the portable device 102 relative to any of the visual indicators of the tag 450 instead of the shelf 106 and/or the product 104 as described above in connection with FIG. 4A. In particular, the processor of the portable device 102 may use any of the visual indicators to guide the user 302 to position and/or orient the portable device 102 in relationship to the shelf 106. In some examples, the portable device 102 may use information from any of the visual indicators (e.g., information pertaining to an expected shelf size and/or expected product size) in conjunction with camera imaging to determine whether the user 302 has properly positioned and/or oriented the portable device 102. In some examples, the visual indicator on the tag 450 is used solely to guide the user 302 to properly aim the portable device 102. In this example, the cross-hair 406 and the reticle 408 are semi-translucent to aid in positioning and/or orienting the portable device 102 relative to whichever visual indicator(s) on the tag 450 is used. In some examples, information on the tag 450 is used by the portable device 102 to associate a detected inventory condition with product information (e.g., a SKU) for inventory record-keeping, for example.

Similar to the example described above in connection with FIG. 4A, once the user 302 has properly oriented and/or positioned the portable device 102, the user 302 pushes the button 410 to transmit a signal (e.g., an acoustic signal). Alternatively, the portable device 102 automatically transmits the signal when the portable device 102 is properly oriented and/or positioned, and the indicator 412 informs the user 302 as to whether this mode is enabled.

Figure 5:
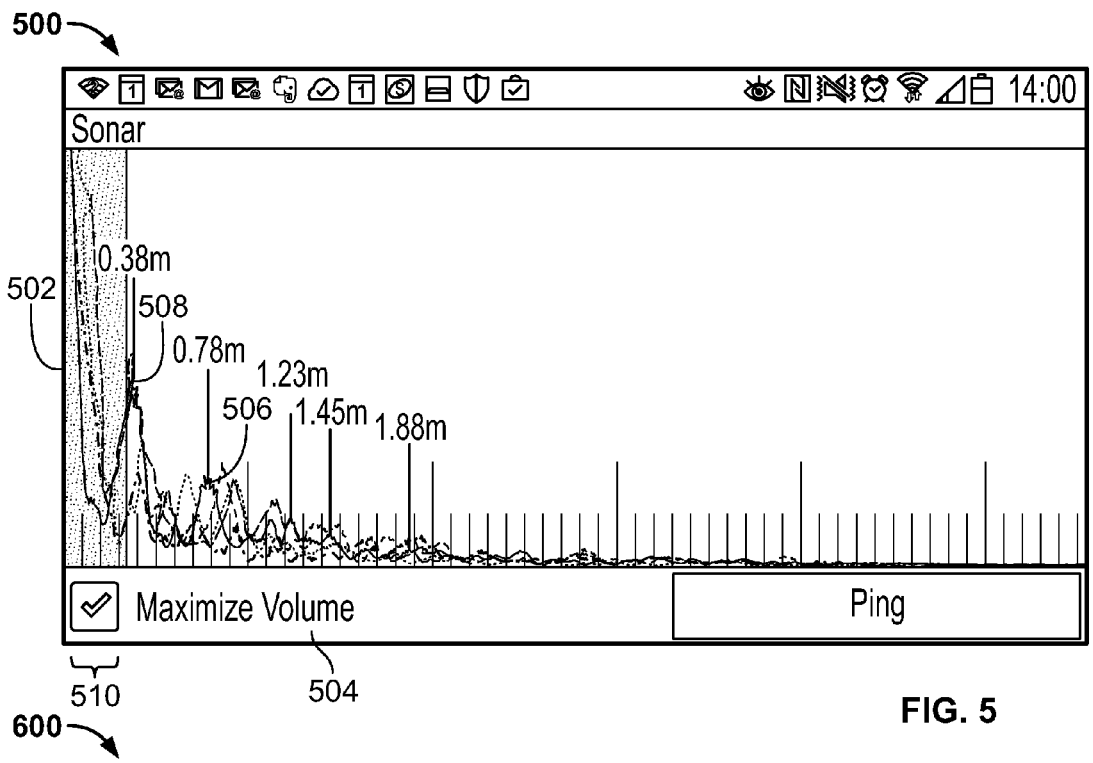
FIG. 5 is an example graph depicting a time-history of detected reflection signals as a function of time in the first example scenario of FIG. 1.

FIG. 5 is an example graph 500 depicting a time history of detected signals of the first scenario described above in connection with FIG. 1 where baseline inventory data has been obtained. Similar to the example scenario described above in FIG. 1, a portable device has been directed to transmit a signal that travels around and/or above product stored on a relatively full shelf (e.g., a fully stocked shelf), for example. The example graph 500 includes a vertical axis 502 representing an amplitude of a detected reflected signal at the portable device and a horizontal axis 504 representing time. In this example, a curve 506 represents a measured reflected signal corresponding to a transmitted signal from the portable device. A first peak 508 of the curve 506 is a characteristic feature of the reflected signal corresponding to a baseline inventory condition when the shelf is fully stocked in this example. A first portion of the curve 506 represented by a band 510 is disregarded because it pertains to a portion of the signal that is directly reflected from a rear surface of the shelf and/or reflected signals from the product itself.

In this example, an amplitude of the first peak 508 is determined to characterize the baseline inventory condition. Additionally or alternatively, a time delay of the first peak 508 is determined and/or recorded (e.g., the time of flight of the reflected signal from when a ping is transmitted) to characterize the baseline inventory condition. In particular, the time at which the first peak 508 occurs relative to when an acoustic ping is transmitted or when the portable device begins recording the reflected signals is used to characterize a time delay and/or a relative time delta of the first peak 508. In some examples, a combination of the amplitude of the first peak 508 in conjunction with the time delay of the first peak 508 is used to characterize the curve 506 and, thus, the baseline inventory condition. In some examples, other peaks and/or signals recorded in the reflected signal are used to characterize the reflected signal of the baseline inventory condition.

Figure 6:
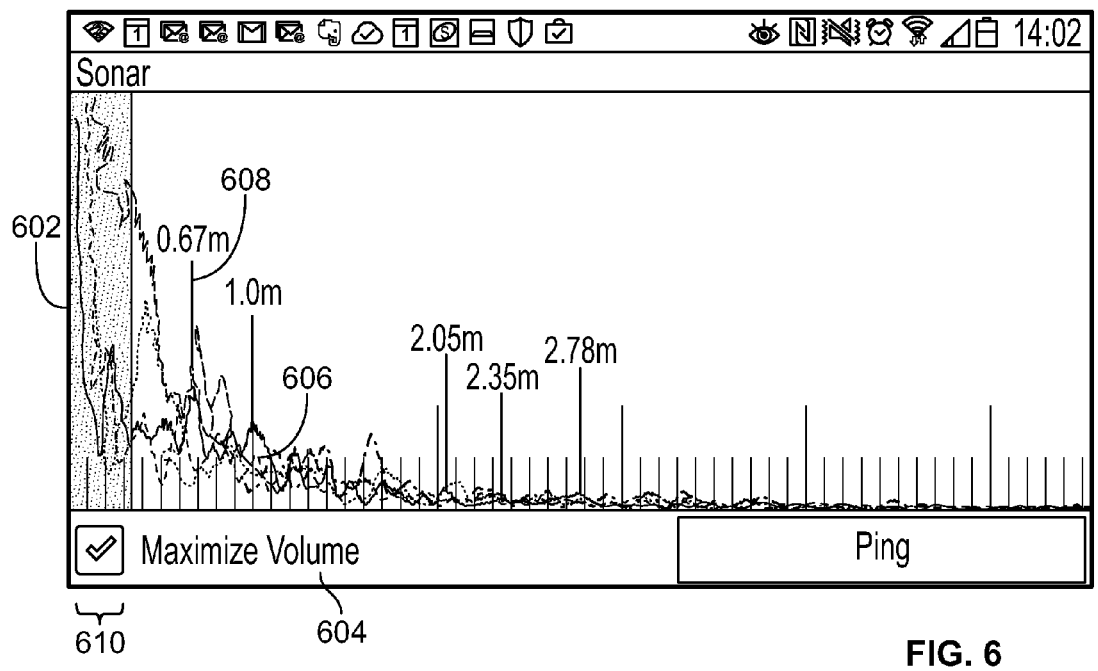
FIG. 6 is an example graph depicting a time history of detected reflection signals as a function of time in the second example scenario of FIG. 2.

FIG. 6 is an example graph 600 depicting a time history of detected reflected signals in the second scenario of FIG. 2 where a second inventory condition (e.g., a non-baseline inventory condition) is being determined and/or analyzed. In this example, the shelf is partially stocked. The graph 600 includes a vertical axis 602, which represents an amplitude of a detected reflected signal at the portable device and a horizontal axis 604, which represents time. In this example, a curve 606 represents a detected reflected signal corresponding to a transmitted signal from the portable device in the second inventory condition. Similar to the peak 508 of FIG. 5, a first peak 608 of the curve 606 of the illustrated example is characteristic (e.g., amplitude and/or time delay, etc. of the first peak 608.) of the second inventory condition of the shelf. In this example, a first portion of the curve 606 represented by a band 610 is disregarded because it pertains to a portion of the signal that is directly reflected from a rear surface of the shelf. Alternatively, in some examples, the portion represented by the band 610 is not disregarded. In particular, a time delay of a signal directly reflected from a rear surface of the shelf (e.g., an earlier peak within the time band 610) is used in conjunction with the time delay of the peak 608 to determine the second inventory condition (e.g., the different travel times are used to estimate a distance between the product and the rear surface), for example.

In this example, the baseline data of the graph 500 (e.g., characteristics of the first peak 508) of FIG. 5 is analyzed in conjunction with the reflected signal 606 and/or the first peak 608 to determine the second inventory condition. In particular, a difference in amplitude (e.g., a differential attenuation, an attenuation difference) and/or time delay of the peak 608 of the illustrated example in relation to the peak 508 is used to determine the second inventory condition. The difference in amplitudes, in some examples, is used to calculate a distance between the rear surface of the shelf and product on the shelf and/or an amount of inventory on the shelf. Additionally or alternatively, the difference in time of the reflected signals between the peak 508 and the peak 608 is used to calculate a differential time delay, which in turn is used to calculate a distance between the rear surface of the shelf and product on the shelf, a product depth and/or an amount of inventory on the shelf.

As mentioned above, in some examples, the baseline inventory condition is not used for inventory determinations. In particular, the portable device can use the time delay of the first peak 608 (e.g., the time delay of the first peak 608 in comparison to directly reflected signals from the rear surface of the shelf) to calculate a distance between the rear surface of the shelf and product on the shelf. Alternatively, the portable device can use a time differential that is based on a known or calculated distance of the portable device to the shelf, a depth of the shelf, dimensions of the product and/or calculated time delays when the product is fully stocked on the shelf, for example.

In some examples, simply recognizing a difference between a reflected acoustic signal of the baseline condition and a reflected signal of the second inventory condition is sufficient to indicate that the inventory condition of the shelf has changed. In these examples, determining an existence of a change of the reflected acoustic signals from the baseline condition indicates a change in inventory condition (e.g., the shelf is not fully stocked). In other words, an existence of an inventory condition change (e.g., a delta) of the shelf has been determined, but the extent to what the inventory condition has changed is not analyzed or determined. For example, only a determination that the shelf is no longer fully stocked is determined and/or conveyed and the amount of production stocked on the shelf is not conveyed.

In some examples, an overall shape comparison between the curve 506 and the curve 606 is used to determine the second inventory condition. In particular, a shift in peaks and/or overall shape of the curve 606 in comparison to the curve 506 and/or a relative change in amplitude of multiple peaks is used to determine the second inventory condition, for example. While specific analysis techniques have been shown to characterize the first inventory condition and/or the second inventory condition, numerous other calculations and/or relationships may be used to characterize the amount of the product on the shelves.

Figure 7:
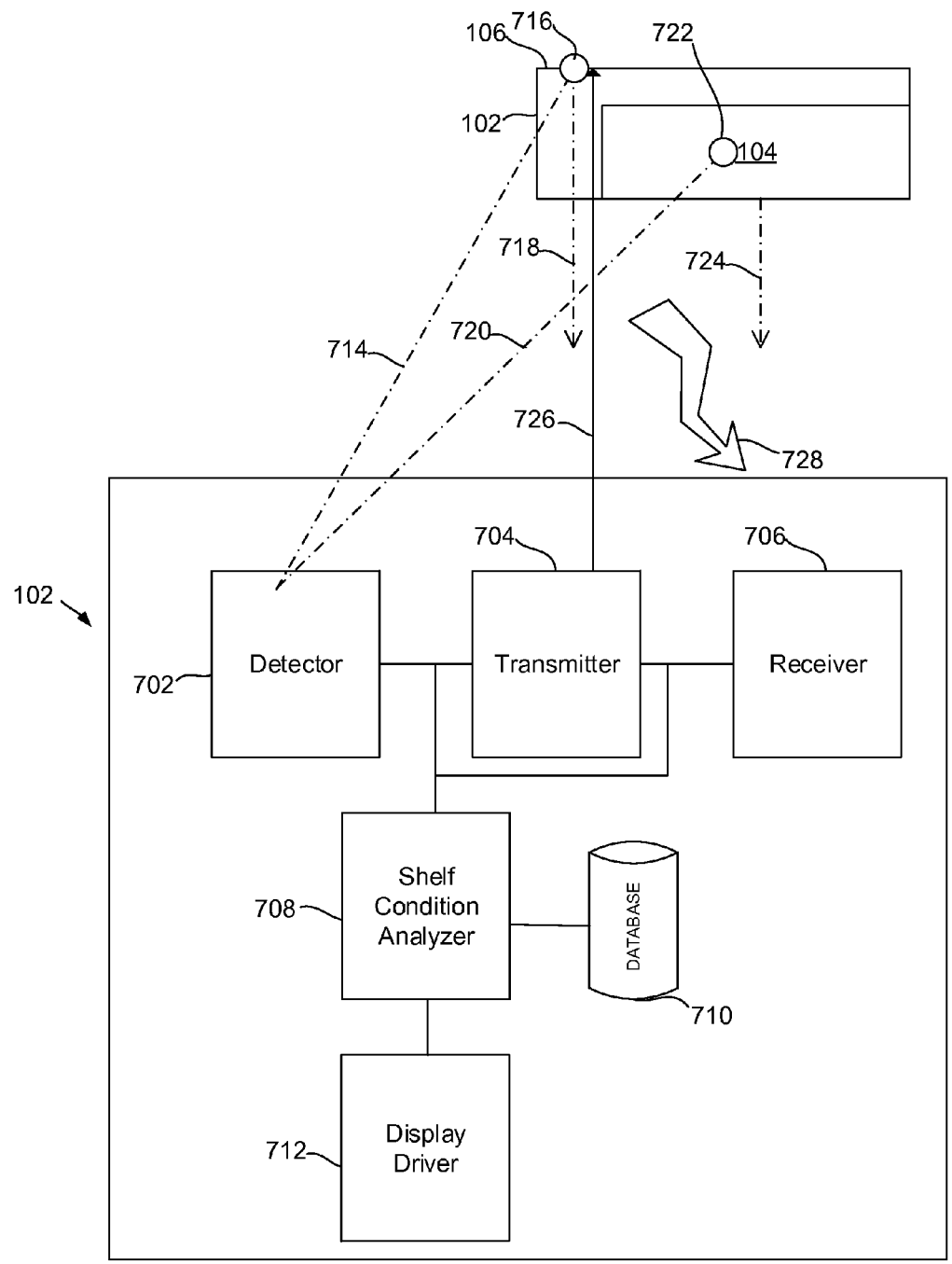
FIG. 7 is a schematic representation of the example portable device of FIG. 1.

FIG. 7 is a schematic representation of the example portable device 102 of FIG. 1. The example portable device 102 of the illustrated example includes a detector (e.g., an imaging device, a digital camera, an infrared camera, etc.) 702, a transmitter (e.g., an acoustic transmitter, a speaker, etc.) 704, a receiver (e.g., an acoustic receiver, a microphone, etc.) 706, a shelf condition analyzer 708, a database 710 and a display driver 712.

The detector 702 of the illustrated example operates in conjunction with the display driver 712 and/or the shelf condition analyzer 708 to guide a user (e.g., the user 302) to the hold the portable device 102 in a proper position and/or orientation relative to a shelf, in which product is stored thereon. Once a proper position and/or orientation of the portable device 102 is established and/or the portable device 102 is in a proper positional and/or orientation range(s), the processor triggers the transmitter 704 to transmit an acoustic signal and the receiver 706 to receive a corresponding reflected signal for analysis of the reflected signal by the shelf condition analyzer 708 and/or storage of data corresponding to the reflected signal in the database 710. In some examples, triggering the transmission of the acoustic signal is automatic when the portable device 102 is in the proper position and/or orientation, thereby reducing unnecessary or time-consuming inputs from the user.

In operation, the detector 702 of the illustrated example use a sightline 714 to target a position 716, which has a corresponding viewing/alignment vector 718, of the shelf 106 to guide a user via the display driver 712 and/or a display (e.g., the display 404) associated with the display driver 712 to guide the user to position and/or aim the portable device 102 relative to the viewing/alignment vector 718. Alternatively, in some examples, the detector 702 uses a sightline 720 directed towards a position 722 with a corresponding viewing/alignment vector 724 relative to the product 104 to guide the user to orient and/or position the portable device 302 relative to the viewing/alignment vector 724 of the product 104 instead of a space around the product 104. In some examples, a combination of the shelf 106 and the product 104 is used to guide the user to orient and/or position the portable device 102. In other examples, visual cues on a tag such as the tag 450 are used to position and/or orient the portable device 102. Regardless, once the portable device 102 is proper oriented and/or positioned (e.g., within a proper orientation range and/or positional range), a signal (e.g., an acoustic ping) 726 is transmitted from the transmitter 704 and the corresponding reflected signal 728 is analyzed to determine and/or record the inventory condition of the shelf 106. While acoustic signals are described in the illustrated example, any other type of signal may be used (infrared, radio, transmitted light, etc.).

Figure 8:
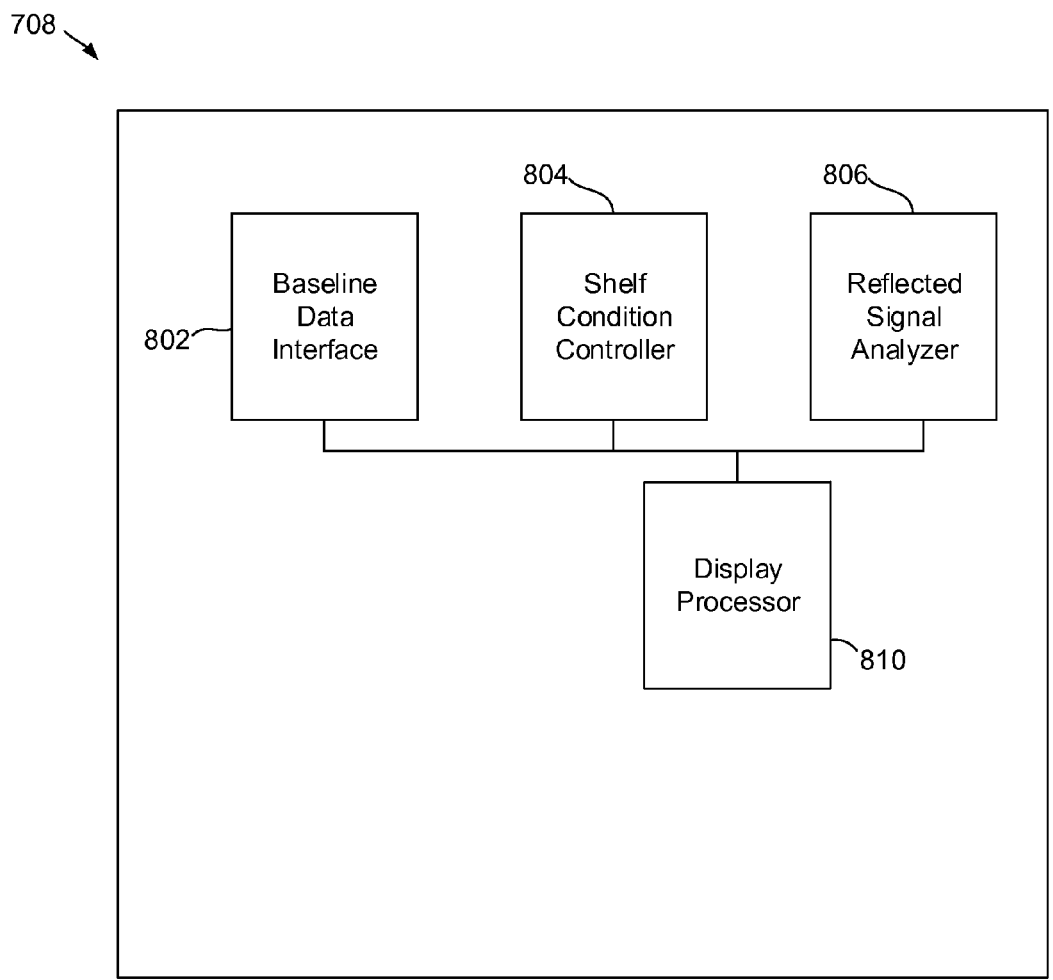
FIG. 8 further details a shelf condition analyzer of FIG. 7.

FIG. 8 further details the example shelf condition analyzer 708 of FIG. 7. The shelf condition analyzer 708 of the illustrated example includes an example baseline data interface 802, an example shelf condition controller 804, an example reflected signal analyzer 806 and an example display processor 810.

In the illustrated example of FIG. 8, the baseline data interface 802 stores baseline data, coordinates storing of the baseline data and/or indexes stored baseline data corresponding to a baseline inventory condition of a shelf, for example. In some examples, the reflected signal analyzer 806 receives reflected signals and/or data pertaining to the reflected signals of a second inventory condition of the shelf from a sensor, for example, and conveys the reflected signals and/or data to the shelf condition controller 804. In turn, the shelf condition controller 804 of the illustrated example determines relevant differences between the baseline data and the reflected signals (e.g., using time delays between peaks of the baseline data and peaks of the reflected signal). In some examples, the shelf condition controller 804 determines the second inventory condition (e.g., an extent to which the shelf is occupied) by utilizing data from the baseline data interface 802 and the reflected signal analyzer 806. In this example, to determine the second inventory condition, the shelf condition controller 804 uses a comparison of baseline inventory condition peaks retrieved from the baseline data analyzer 802 with peaks of the reflected signals pertaining to the second inventory condition and provided by the reflected signal analyzer 806.

In some examples, the shelf condition controller 804 and/or the reflected signal analyzer 806 determines whether reflected signals correspond to the baseline inventory condition or the second inventory condition. In some examples, the display processor 810 of the illustrated example displays data related to the second inventory condition. In some examples, the display processor 810 also guides a user (e.g., the user 302) to position a portable device to a proper position and/or orientation relative to the shelf. In some examples, the shelf condition controller 804 and/or the reflected signal analyzer 806 verifies that the reflected signals were measured at a proper orientation and/or position relative to the shelf.

While an example manner of implementing the portable device 102 of FIGS. 1-4B is illustrated in FIGS. 7 and 8, one or more of the elements, processes and/or devices illustrated in FIGS. 7 and 8 may be combined, divided, re-arranged, omitted, eliminated and/or implemented in any other way. Further, the example detector 702, the example transmitter 704, the example receiver 706, the example shelf condition analyzer 708, the example database 710, the example display driver 712, the baseline data analyzer 802, the shelf condition controller 804, the reflected signal analyzer 806, the display processor 810 and/or, more generally, the example portable device 102 of FIG. 1 may be implemented by hardware, software, firmware and/or any combination of hardware, software and/or firmware. Thus, for example, any of the example detector 702, the example transmitter 704, the example receiver 706, the example shelf condition analyzer 708, the example database 710, the example display driver 712, the baseline data analyzer 802, the shelf condition controller 804, the reflected signal analyzer 806, the display processor 810 and/or, more generally, the example portable device 102 of FIG. 1 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example detector 702, the example transmitter 704, the example receiver 706, the example shelf condition analyzer 708, the example database 710, the example display driver 712, the baseline data analyzer 802, the shelf condition 804, the reflected signal analyzer 806, the display processor 810 is/are hereby expressly defined to include a tangible computer readable storage device or storage disk such as a memory, a digital versatile disk (DVD), a compact disk (CD), a Blu-ray disk, etc. storing the software and/or firmware. Further still, the example portable device 102 of FIG. 1 may include one or more elements, processes and/or devices in addition to, or instead of, those illustrated in FIGS. 7 and 8, and/or may include more than one of any or all of the illustrated elements, processes and devices.

Figure 9:
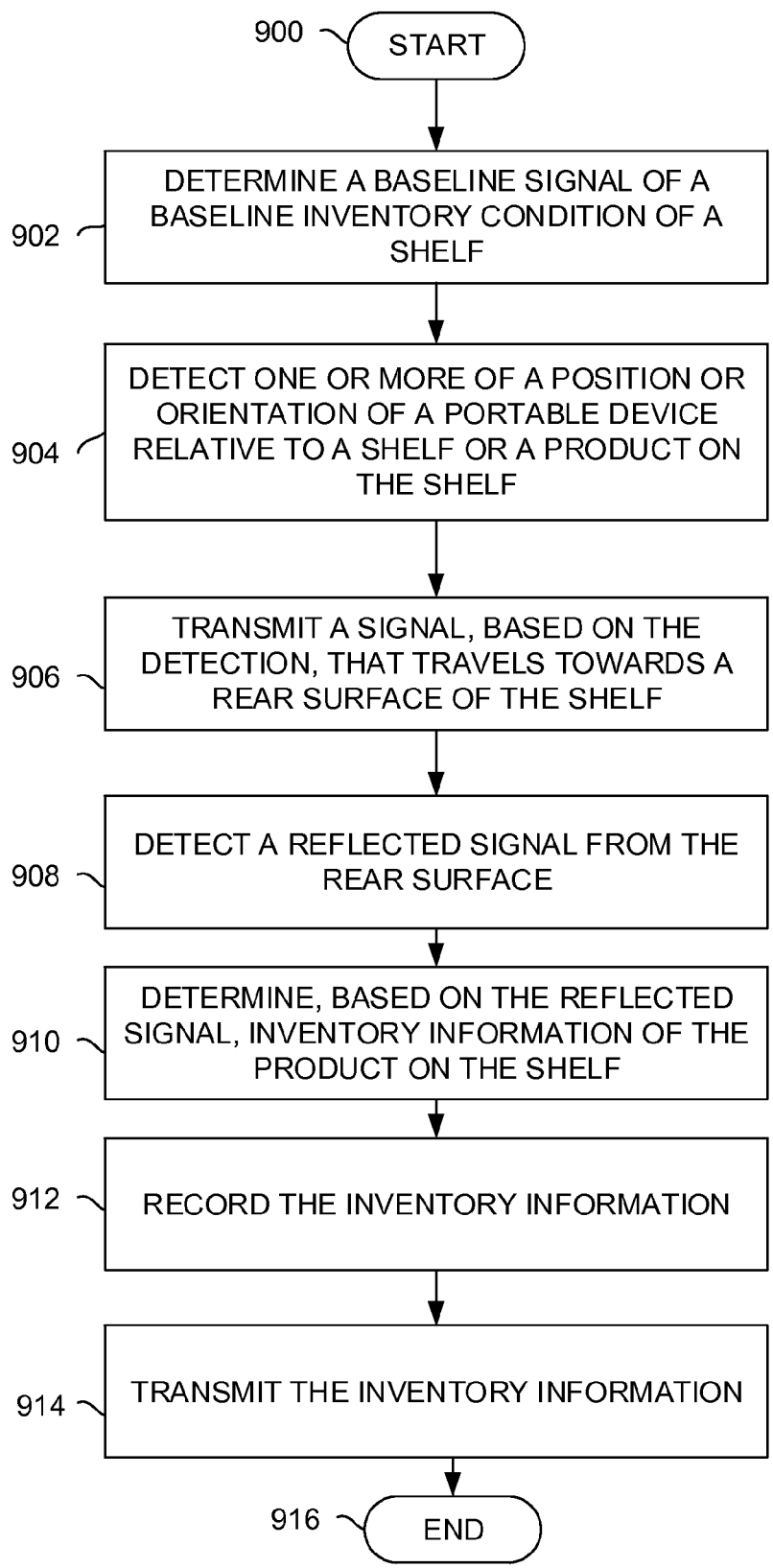
FIG. 9 is a flowchart representative of an example process for implementing the example portable device of FIG. 1.
Figure 10:
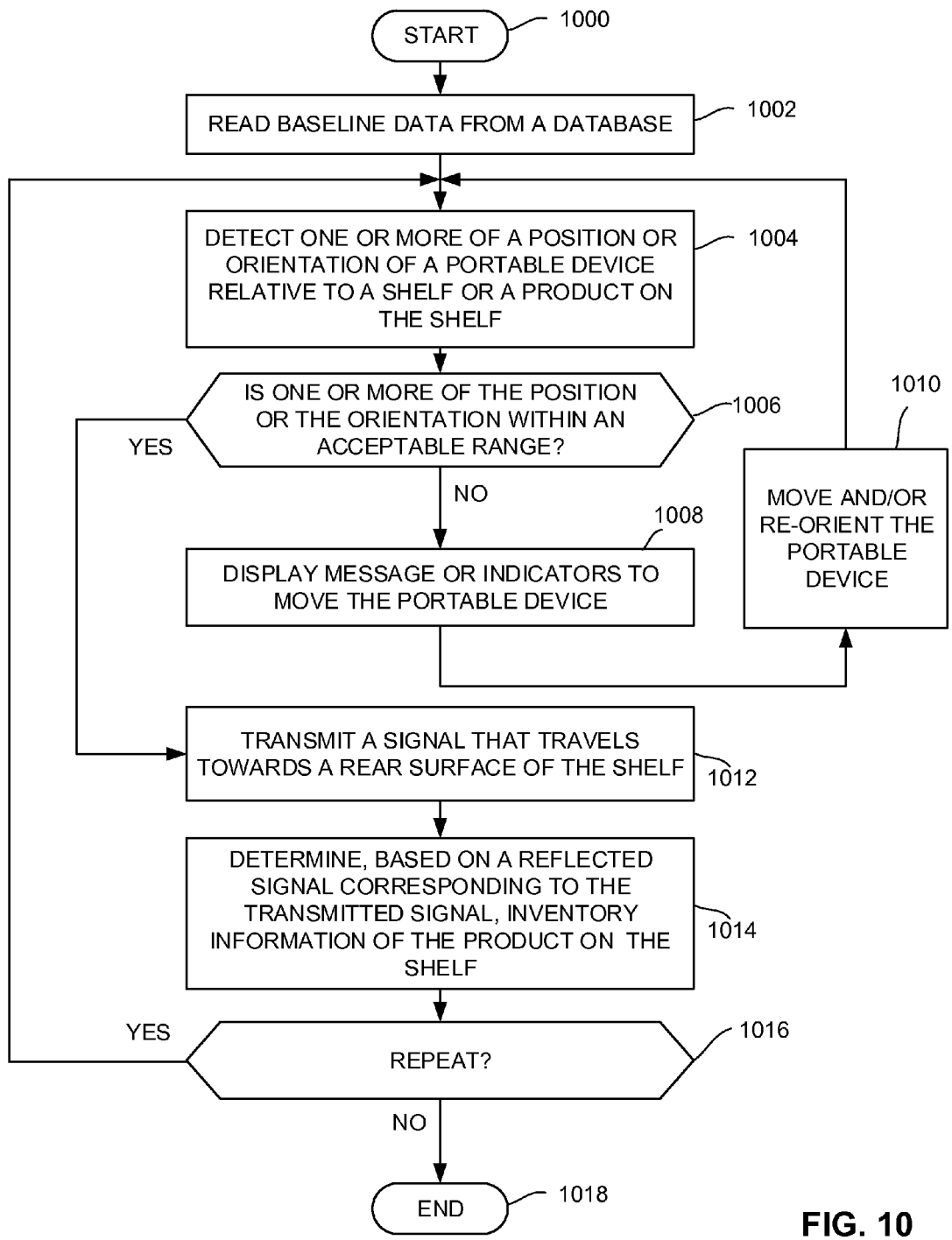
FIG. 10 is a flowchart representative of an alternative example process for implementing the example portable device of FIG. 1.

Flowcharts representative of example machine readable instructions for implementing the portable device 102 of FIG. 1 are shown in FIGS. 9 and 10. In these examples, the machine readable instructions comprise a program for execution by a processor such as the processor 1112 shown in the example processor platform 1000 discussed below in connection with FIG. 11. The program may be embodied in software stored on a tangible computer readable storage medium such as a CD-ROM, a floppy disk, a hard drive, a digital versatile disk (DVD), a Blu-ray disk, or a memory associated with the processor 1112, but the entire program and/or parts thereof could alternatively be executed by a device other than the processor 1112 and/or embodied in firmware or dedicated hardware. Further, although the example program is described with reference to the flowcharts illustrated in FIGS. 9 and 10, many other methods of implementing the example portable device 102 may alternatively be used. For example, the order of execution of the blocks may be changed, and/or some of the blocks described may be changed, eliminated, or combined.

As mentioned above, the example processes of FIGS. 9 and 10 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 9 and 10 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 9 is a flowchart representative of an example process for implementing the example portable device 102 of FIG. 1. The program of FIG. 9 begins at block 900 where a portable device (e.g., the portable device 102) is initialized to determine an inventory condition of product (e.g., the product 104) on a shelf (e.g., the shelf 106) (block 900). This initialization may occur by a user starting an application, providing input and/or the portable device determining that the user will gather inventory information (e.g., by use of a camera or other detector, etc.).

In this example, a baseline signal (e.g., a reflected baseline inventory signal) is determined and/or measured in a manner similar to the example described above in connection with FIG. 3 by an analyzer such as the baseline data analyzer 802 (block 902). In this example, the baseline signal corresponds to when the shelf is fully stocked by the product and the user is guided by the portable device to properly align and/or orient the portable device in relation to the shelf and/or the product on the shelf. In some examples, the portable device has a predefined size of the product stored in a database (e.g., the database 710) and/or stored default optic characteristics (e.g., default lens dimensions of a lens of the camera, lens aspect ratios of the camera lens, etc.) to guide the user to a distance at which the baseline acoustic baseline data should be taken. After the user places the portable device in an appropriate orientation and/or position (e.g., within acceptable ranges), the user gathers the baseline data with the portable device. Alternatively, instead characterizing the baseline signal, baseline inventory data may be pre-determined and/or pre-calculated (e.g., an expected time of flight and/or amplitude of a first peak, etc.), for example. In some examples, baseline inventory data is not utilized.

In this example, after the baseline inventory data is determined and/or defined, the inventory condition changes (e.g., after a few hours of a retail store being open, etc.) and, thus, a second inventory condition (e.g., a non-baseline inventory condition) occurs. In some examples, a reflected signal analyzer such as the reflected signal analyzer 806 determines a current inventory condition. Additionally or alternatively, a controller such as the shelf condition controller 804 determines whether the inventory condition has changed and/or whether reflected signals correspond to the baseline inventory condition or the second inventory condition. To gather characteristic data of the second inventory condition, analyze the second inventory condition and/or analyze the second inventory condition relative to the first baseline inventory condition, the portable device detects one or more of a position or an orientation of the portable device relative to the shelf or the product on the shelf (block 904). In this example, the manner in which the portable device is positioned and/or oriented for the second inventory condition is similar to the aforementioned manner in which the baseline inventory condition data is obtained.

Next, once the user has properly positioned and/or oriented the portable device, the portable device transmits a signal, based on the detected position and/or orientation of the portable device that travels around the product and towards a rear surface of the shelf (block 906). In some examples, the portable device automatically transmits (e.g., automatically triggers transmission without user input) the signal once the user places the portable device at the proper position and/or orientation. In particular, the portable device of the illustrated example can use the camera of the portable device to make the determination that the portable device is at the proper position and/or orientation, and consequently trigger a transmitter (e.g., a speaker) of the portable device to transmit the signal (e.g., an acoustic ping). In some examples, the portable device does not allow the user to proceed (e.g., command the portable device to transmit the signal) without the portable device being properly oriented and/or positioned.

After the portable device transmits the signal, the portable device then detects a reflected signal corresponding to the transmitted signal (block 908). In some examples, an analyzer such as the reflected signal analyzer 806 is used to characterize the reflected signal. In some examples, to characterize the reflected signal, the portable device may employ noise canceling or other similar technologies to process the reflected signal prior to storing and/or analyzing the reflected signal, for example.

Once the reflected signal has been detected, the portable device then determines inventory information of the product on the shelf that corresponds to the second inventory condition by a shelf condition analyzer such as the shelf condition analyzer 708 and/or a shelf condition controller such as the shelf condition controller 804 (block 910). In this example, the portable device compares the reflected baseline signal to the reflected signal of the second inventory condition. In some examples, a peak amplitude and/or time delay relationships between reflected peaks corresponding to the first and second inventory conditions, such as the peak 508 and a second reflected peak such as the peak 608 described above in connection with FIGS. 5 and 6, respectively, are used to determine the second inventory condition (e.g., how much of the product is stored on the shelf). In other examples, an amount of product stored on the shelf is not determined and only whether a reflected signal of the second inventory condition differs from a reflected signal of the first inventory condition is determined (e.g., the second inventory condition is simply different). In other examples, no baseline inventory signal is required and only a time of flight of a reflected signal is used in conjunction with dimensions such as a distance to the shelf, a depth of the shelf and/or dimensions of the product, for example, to determine an amount of the product on the shelf.

The portable device of the illustrated example then records the inventory information to a database such as the database 710, for example (block 912). In some examples, the portable device associates an image of the product taken during the data collection (e.g., during baseline inventory data collection and/or during data collection of the second inventory condition or any other appropriate time) to the determined inventory condition (e.g., 5 units of product X on shelf 9, shelf 9 is approximately 30% full with product X, etc.). In some examples, visual cues and/or indicators on the product and/or the shelf (e.g., the tag 450) provide information to the portable device on the product to be associated with the inventory data recorded, determined and/or analyzed.

The portable device, in some examples, transmits the inventory information (for further processing and/or to aid in logistics management e.g., transmits to a central server via a wireless connection and/or Wi-Fi, etc.) (block 914) and the process ends (block 916). In some examples, the user moves between shelves, thereby automatically recording reflected acoustic signals to determine inventory condition(s) with little or no user inputs, which allows the user to automatically transition between the shelves (e.g., a combination of the portable device and/or servers automatically determines specific products and/or shelves via a camera of the portable device, etc.).

FIG. 10 is a flowchart representative of an alternate process for implementing the example portable device 102 of FIG. 1. The example process begins at block 1000 where baseline inventory condition data (e.g., a reflected acoustic signal) has been recorded, predetermined and/or accessed from a database and a portable device (e.g., the portable device 102) is being used to determine and/or analyze a second inventory condition (block 1000). In this example, the baseline inventory condition data is read from a database by a baseline data analyzer such as the baseline data analyzer 802 (block 1002). The portable device of the illustrated example detects and/or determines one or more of a position and/or an orientation of the portable device relative to a shelf (e.g., the shelf 106) and/or a product (e.g., the product 104) on the shelf (block 1004).

The portable device of the illustrated example then determines whether the position and/or the orientation of the portable device is within an acceptable range via a camera of the portable device that is generally directed towards the shelf, for example (block 1006). This detection and/or determination may occur via a controller such as the shelf condition controller 804 and/or a reflected signal analyzer such as the reflected signal analyzer 806. In some examples, the range(s) is pre-determined and/or based on a defined relative position and/or orientation of the portable device relative to the shelf such that the portable device can transmit a signal that travels around (e.g., over, to the side, under) the product. If the position and/or orientation of the portable device is not within an acceptable range (block 1006), a message or a graphical indicator (e.g., a distance graph, a symbol, etc.) is displayed on a display of the portable device (e.g., by the display driver 712 and/or the display processor 810). In some examples, information such as graphical guides, a range indicator and/or a reticle (e.g., the reticle 408) are displayed to guide a user to position and/or orient the portable device in an appropriate position and/or orientation (block 1008). In this example, based on the information displayed, the portable device is moved and/or re-oriented (block 1010) and the process restarts (block 1000). If the portable device was in an orientation and/or position within the acceptable range and/or has been moved and/or re-oriented accordingly (block 1006), the portable device transmits the signal that travels around the product and towards a rear surface of the shelf that faces towards the product (block 1012).

The portable device of the illustrated example then determines, based on a reflected signal from the rear surface of the shelf that corresponds to the transmitted signal, inventory information of the product on the shelf (block 1014). In some examples, a shelf condition controller such as the shelf condition controller 804 and/or an analyzer such as the reflected signal analyzer 806 is used to determine the inventory information. In this example, the portable device compares relative first peak amplitudes of the baseline inventory condition and the reflected signal to one another (e.g., an amplitude of the peak 508 to an amplitude of the peak 608) to determine the amount of the product on the shelf.

If the process is determined to be repeated (e.g., another shelf inventory condition of another shelf, etc.) (block 1016), the process repeats (block 1000). Otherwise, the process ends (block 1018).

Figure 11:
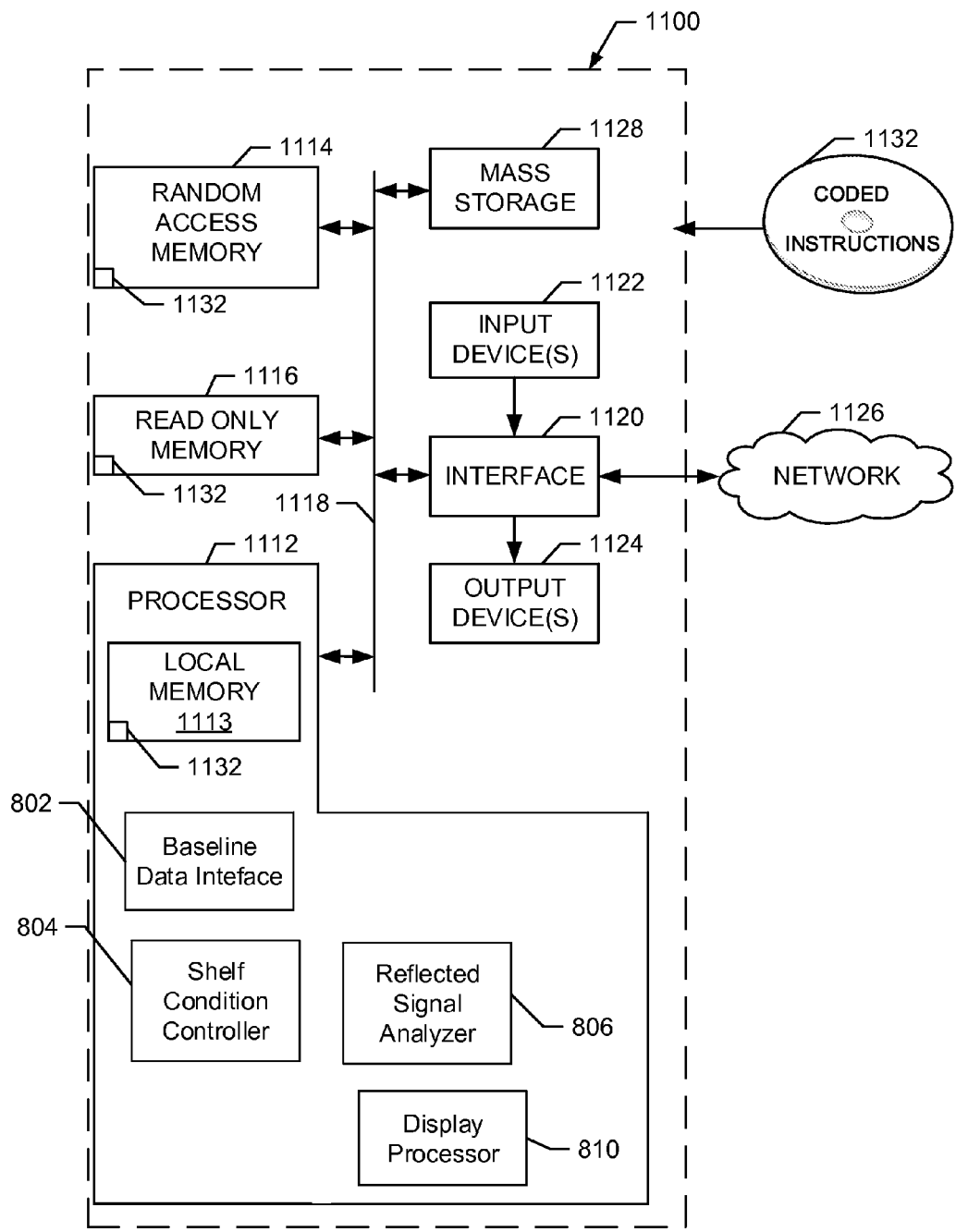
FIG. 11 is a block diagram of an example processor platform capable of executing machine readable instructions to implement the processes of FIGS. 9 and 10.

FIG. 11 is a block diagram of an example processor platform 1100 capable of executing the instructions of FIGS. 9 and 10 to implement the portable device 102 of FIGS. 7 and 8. The processor platform 1100 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 1100 of the illustrated example includes a processor 1112. The processor 1112 of the illustrated example is hardware. For example, the processor 1112 can be implemented by one or more integrated circuits, logic circuits, microprocessors or controllers from any desired family or manufacturer.

The processor 1112 of the illustrated example includes a local memory 1113 (e.g., a cache). The example processor 1112 also the baseline data analyzer 802, the shelf condition controller 804, the reflected signal analyzer 806 and the display processor 810. The processor 1112 of the illustrated example is in communication with a main memory including a volatile memory 1114 and a non-volatile memory 1116 via a bus 1118. The volatile memory 1114 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1116 may be implemented by flash memory and/or any other desired type of memory device. Access to the main memory 1114, 1116 is controlled by a memory controller.

The processor platform 1100 of the illustrated example also includes an interface circuit 1120. The interface circuit 1120 may be implemented by any type of interface standard, such as an Ethernet interface, a universal serial bus (USB), and/or a PCI express interface.

In the illustrated example, one or more input devices 1122 are connected to the interface circuit 1120. The input device(s) 1122 permit(s) a user to enter data and commands into the processor 1112. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1124 are also connected to the interface circuit 1020 of the illustrated example. The output devices 1124 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1120 of the illustrated example, thus, typically includes a graphics driver card, a graphics driver chip or a graphics driver processor.

The interface circuit 1120 of the illustrated example also includes a communication device such as a transmitter, a receiver, a transceiver, a modem and/or network interface card to facilitate exchange of data with external machines (e.g., computing devices of any kind) via a network 1126 (e.g., an Ethernet connection, a digital subscriber line (DSL), a telephone line, coaxial cable, a cellular telephone system, etc.).

The processor platform 1100 of the illustrated example also includes one or more mass storage devices 1128 for storing software and/or data. Examples of such mass storage devices 1128 include floppy disk drives, hard drive disks, compact disk drives, Blu-ray disk drives, RAID systems, and digital versatile disk (DVD) drives.

The coded instructions 1132 of FIGS. 9 and 10 may be stored in the mass storage device 1128, in the volatile memory 1114, in the non-volatile memory 1116, and/or on a removable tangible computer readable storage medium such as a CD or DVD.

From the foregoing, it will be appreciated that the above disclosed methods and apparatus enable quick and convenient data collection related to inventory/stock conditions of retail shelves. In particular, the examples disclosed herein allow relatively quick and convenient data collection of inventory conditions that may be hard to determine based on visual inspection when inventory is pushed to a front of a shelf, for example, which is common in retail environments. The examples disclosed herein do not require expensive equipment and/or extensive installation of equipment for inventory determinations.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A portable device comprising:
   a detector to determine one or more of an orientation or a position of the portable device relative to at least one of a product or a shelf to store the product, the portable device independent of the shelf, the detector including a camera;
   a transmitter to transmit a signal towards at least one of the product or a rear surface of the shelf, the rear surface facing toward a position where the product is to sit on the shelf;
   a receiver to receive a reflected signal corresponding to the transmitted signal, the reflected signal reflected from the at least one of the rear surface of the shelf or the product; and a processor to enable the transmitter based on the determined one or more of the orientation or the position of the portable device, and to determine inventory information about the product based on the reflected signal.

2. The portable device as defined in claim 1, wherein the inventory information is further based on a baseline signal corresponding to a baseline inventory condition of the product.

3. The portable device as defined in claim 2, wherein the baseline inventory condition includes a desired amount of product to be stored on the shelf.

4. The portable device as defined in claim 1, wherein the processor is to cause the transmitter to transmit the signal based on an output of the detector.

5. The portable device as defined in claim 1, wherein the transmitter is located on a module coupled to the portable device.

6. The portable device as defined in claim 1, wherein the processor is to associate a stock keeping unit (SKU) with the product.

7. The portable device as defined in claim 6, wherein the processor is to associate the stock keeping unit (SKU) with the product based on the camera detecting one or more of a bar code or a QR code on or proximate the product.

8. A portable device comprising:
a detector to determine one or more of an orientation or a position of the portable device relative to at least one of a product or a shelf to store the product, the portable device independent of the shelf;
a transmitter to transmit a signal towards at least one of the product or a rear surface of the shelf, the rear surface facing toward a position where the product is to sit on the shelf, the transmitter including a speaker;
a receiver to receive a reflected signal corresponding to the transmitted signal, the reflected signal reflected from the at least one of the rear surface of the shelf or the product; and
a processor to enable the transmitter based on the determined one or more of the orientation or the position of the portable device, and to determine inventory information about the product based on the reflected signal.

9. A portable device comprising:
a detector to determine one or more of an orientation or a position of the portable device relative to at least one of a product or a shelf to store the product, the portable device independent of the shelf;
a transmitter to transmit a signal towards at least one of the product or a rear surface of the shelf, the rear surface facing toward a position where the product is to sit on the shelf, the signal including a sound signal;
a receiver to receive a reflected signal corresponding to the transmitted signal, the reflected signal reflected from the at least one of the rear surface of the shelf or the product; and
a processor to enable the transmitter based on the determined one or more of the orientation or the position of the portable device, and to determine inventory information about the product based on the reflected signal.

10. A method comprising:
determining, with a processor of a portable device, at least one of a position or orientation of the portable device relative to at least one of a shelf to hold a product or the product, the portable device independent of the shelf;
displaying a message or prompt to move or re-orient the portable device when at least one of the position or orientation of the portable device is not within an acceptable range;
transmitting, from the portable device and based on the determined position or the orientation of the portable device, a signal to travel towards at least one of the product or a rear surface of the shelf, the rear surface facing towards a position on which the product is to be located;
detecting, with the processor, a reflected signal corresponding to the transmitted signal, the reflected signal reflected from at least one of the rear surface of the shelf or the product; and
determining, with the processor, inventory information about the product based on the reflected signal.

11. The method as defined in claim 10, wherein the determining of the inventory information is further based on a baseline signal corresponding to a baseline inventory condition.

12. The method as defined in claim 11, further including determining the baseline signal.

13. The method as defined in claim 12, wherein the determining of the baseline signal includes determining a reflected signal when a threshold amount of the product is on the shelf.

14. The method as defined in claim 10, wherein the transmitting of the signal automatically occurs when the at least one of the position or the orientation of the portable device is within an acceptable range.

15. The method as defined in claim 10, wherein the displaying of the at least one of the message or the prompt to move or re-orient the portable device includes showing a reticle on a display of the portable device.

16. A method comprising:
determining, with a processor of a portable device, at least one of a position or orientation of the portable device relative to at least one of a shelf to hold a product or the product, the portable device independent of the shelf;
transmitting, from the portable device and based on the determined position or the orientation of the portable device, a signal to travel towards at least one of the product or a rear surface of the shelf, the rear surface facing towards a position on which the product is to be located;
detecting, with the processor, a reflected signal corresponding to the transmitted signal, the reflected signal reflected from at least one of the rear surface of the shelf or the product; and
determining, with the processor, inventory information about the product based on the reflected signal, wherein the determining of the inventory information is based on attenuation of the reflected signal relative to the baseline signal.

17. A tangible machine readable medium comprising instructions, which when executed, cause a processor of a portable device to at least:
detect one or more of a position or an orientation of the portable device relative to at least one of a shelf to support a product or relative to the product, the portable device independent of the shelf;
transmit, based on the detected position or orientation of the portable device, an acoustic signal to travel towards at least one of the product or a rear surface of the shelf, the rear surface facing towards a position on which the product is to be located;
detect a reflected signal corresponding to the transmitted signal, the reflected signal reflected from at least one of the rear surface or the product; and
determine inventory information about the product based on the reflected signal.

18. The machine readable medium as defined in claim 17, wherein the instructions cause the processor to determine the inventory information based on a baseline signal corresponding to a baseline inventory condition.

19. The machine readable medium as defined in claim 18, wherein the instructions cause the machine to determine the baseline signal when a threshold amount of product is on the shelf.

20. The machine readable medium as defined in claim 19, wherein the instructions cause the processor to transmit the signal when one or more of the position or the orientation of the portable device is within an acceptable range.

21. A portable device comprising:
   a detector to determine one or more of an orientation or a position of the portable device relative to at least one of a product or a shelf to store the product, the portable device independent of the shelf;
   a display to provide at least one of a message or a prompt to move or re-orient the portable device when at least one of the position or the orientation of the portable device is not within an acceptable range;
   a transmitter to transmit a signal towards at least one of the product or a rear surface of the shelf, the rear surface facing toward a position where the product is to sit on the shelf;
   a receiver to receive a reflected signal corresponding to the transmitted signal, the reflected signal reflected from the at least one of the rear surface of the shelf or the product; and
   a processor to enable the transmitter based on the determined one or more of the orientation or the position of the portable device, and to determine inventory information about the product based on the reflected signal.

22. The portable device as defined in claim 21, wherein a reticle is shown on the display to facilitate re-orienting the portable device.

23. A portable device comprising:
   a detector to determine one or more of an orientation or a position of the portable device relative to at least one of a product or a shelf to store the product, the portable device independent of the shelf;
   a transmitter to transmit a signal towards at least one of the product or a rear surface of the shelf, the rear surface facing toward a position where the product is to sit on the shelf wherein the transmitter is to transmit an acoustic signal;
   a receiver to receive a reflected signal corresponding to the transmitted signal, the reflected signal reflected from the at least one of the rear surface of the shelf or the product; and
   a processor to enable the transmitter based on the determined one or more of the orientation or the position of the portable device, and to determine inventory information about the product based on the reflected signal.

24. The portable device as defined in claim 23, further including an attachment to direct the acoustic signal from the transmitter.

25. A method comprising:
   determining, with a processor of a portable device, at least one of a position or orientation of the portable device relative to at least one of a shelf to hold a product or the product, the portable device independent of the shelf;
   transmitting, from the portable device and based on the determined position or the orientation of the portable device, a signal to travel towards at least one of the product or a rear surface of the shelf, the rear surface facing towards a position on which the product is to be located;
   detecting, with the processor, a reflected signal corresponding to the transmitted signal, the reflected signal reflected from at least one of the rear surface of the shelf or the product; and
   determining, with the processor, inventory information about the product based on the reflected signal, wherein the determining of at least one of the position or the orientation of the portable device occurs via a camera of the portable device.

26. A method comprising:
   determining, with a processor of a portable device, at least one of a position or orientation of the portable device relative to at least one of a shelf to hold a product or the product, the portable device independent of the shelf;
   transmitting, from the portable device and based on the determined position or the orientation of the portable device, a signal to travel towards at least one of the product or a rear surface of the shelf, the rear surface facing towards a position on which the product is to be located;
   detecting, with the processor, a reflected signal corresponding to the transmitted signal, the reflected signal reflected from at least one of the rear surface of the shelf or the product; and
   determining, with the processor, inventory information about the product based on the reflected signal, wherein the determining of the at least one of the position or orientation of the portable device relative to at least one of the shelf to hold the product or the product includes detecting markings on at least one of the shelf or the product.

27. A method comprising:
   determining, with a processor of a portable device, at least one of a position or orientation of the portable device relative to at least one of a shelf to hold a product or the product, the portable device independent of the shelf;
   transmitting, from the portable device and based on the determined position or the orientation of the portable device, a signal to travel towards at least one of the product or a rear surface of the shelf, the rear surface facing towards a position on which the product is to be located;
   detecting, with the processor, a reflected signal corresponding to the transmitted signal, the reflected signal reflected from at least one of the rear surface of the shelf or the product; and
   determining, with the processor, inventory information about the product based on the reflected signal; and
   associating the product with a stock keeping unit (SKU).

28. The method as defined in claim 27, wherein the associating of the product with the stock keeping unit (SKU) is based on scanning at least one of a bar code or a QR code on or proximate the product.

29. A method comprising:
   determining, with a processor of a portable device, at least one of a position or orientation of the portable device relative to at least one of a shelf to hold a product or the product, the portable device independent of the shelf;
   transmitting, from the portable device and based on the determined position or the orientation of the portable device, a signal to travel towards at least one of the product or a rear surface of the shelf, the rear surface facing towards a position on which the product is to be located, wherein the signal includes an acoustic signal;

detecting, with the processor, a reflected signal corresponding to the transmitted signal, the reflected signal reflected from at least one of the rear surface of the shelf or the product; and determining, with the processor, inventory information about the product based on the reflected signal.

30. A tangible machine readable medium comprising instructions, which when executed, cause a processor of a portable device to at least:

detect one or more of a position or an orientation of the portable device relative to at least one of a shelf to support a product or relative to the product, the portable device independent of the shelf;

cause a display of the portable device to show at least one of a message or a prompt to move or re-orient the portable device;

transmit, based on the detected position or orientation of the portable device, a signal to travel towards at least one of the product or a rear surface of the shelf, the rear surface facing towards a position on which the product is to be located;

detect a reflected signal corresponding to the transmitted signal, the reflected signal reflected from at least one of the rear surface or the product; and determine inventory information about the product based on the reflected signal.

31. The machine readable medium as defined in claim 30, wherein the display is to show a reticle to facilitate re-orienting the portable device.

32. A tangible machine readable medium comprising instructions, which when executed, cause a processor of a portable device to at least:

detect one or more of a position or an orientation of the portable device relative to at least one of a shelf to support a product or relative to the product, the portable device independent of the shelf;

transmit, based on the detected position or orientation of the portable device, a signal to travel towards at least one of the product or a rear surface of the shelf, the rear surface facing towards a position on which the product is to be located;

detect a reflected signal corresponding to the transmitted signal, the reflected signal reflected from at least one of the rear surface or the product;

determine inventory information about the product based on the reflected signal; and associate the product with a stock keeping unit (SKU) based on an image sensed by the portable device.

\* \* \* \* \*